(12) United States Patent
Koike et al.

(10) Patent No.: US 12,066,056 B2
(45) Date of Patent: Aug. 20, 2024

(54) BEARING DEVICE, SPACER, AND MANUFACTURING METHOD

(71) Applicant: NTN Corporation, Osaka (JP)

(72) Inventors: Takashi Koike, Iwata (JP); Yusuke Shibuya, Iwata (JP); Sota Yamaguchi, Iwata (JP)

(73) Assignee: NTN CORPORATION, Osaka (JP)

( * ) Notice: Subject to any disclaimer, the term of this patent is extended or adjusted under 35 U.S.C. 154(b) by 87 days.

(21) Appl. No.: 17/798,830

(22) PCT Filed: Feb. 2, 2021

(86) PCT No.: PCT/JP2021/003613
§ 371 (c)(1),
(2) Date: Aug. 10, 2022

(87) PCT Pub. No.: WO2021/161843
PCT Pub. Date: Aug. 19, 2021

(65) Prior Publication Data
US 2023/0086645 A1 Mar. 23, 2023

(30) Foreign Application Priority Data

Feb. 14, 2020 (JP) ................. 2020-023669
Jan. 13, 2021 (JP) ................. 2021-003421

(51) Int. Cl.
*F16C 32/04* (2006.01)
*F16C 43/04* (2006.01)
*H02K 7/09* (2006.01)

(52) U.S. Cl.
CPC .......... *F16C 32/0474* (2013.01); *F16C 43/04* (2013.01); *H02K 7/09* (2013.01)

(58) Field of Classification Search
CPC .. F16C 32/0474; F16C 43/04; F16C 2233/00; F16C 2380/26; F16C 41/004;
(Continued)

(56) References Cited

U.S. PATENT DOCUMENTS

2003/0234578 A1* 12/2003 Takahashi ............... B60T 8/171
303/168
2008/0069686 A1* 3/2008 Masaki ................... F04D 25/06
415/121.2
2019/0093704 A1* 3/2019 Higashiyama ...... F16C 32/0459

FOREIGN PATENT DOCUMENTS

EP 1342633 B1 1/2010
EP 3754218 A1 12/2020
(Continued)

OTHER PUBLICATIONS

Wolf Gert et al. DE 102007040505 (Year: 2009).*
(Continued)

*Primary Examiner* — Ahmed Elnakib
(74) *Attorney, Agent, or Firm* — Rimon P.C.

(57) ABSTRACT

A bearing device includes: a magnetic ring fixed to an inner ring; and a stator fixed to an outer ring so as to face magnetic ring. Magnetic ring and stator constitute a claw pole type generator. Stator includes a coil and a magnetic yoke surrounding coil. The magnetic yoke is configured by combining a first member and a second member that are magnetic bodies. First member and second member have an identical shape. Each of first member and second member has a plurality of second claws arranged in a comb shape. A plurality of first claws of first member and the plurality of second claws of second member are alternately arranged on a surface facing magnetic ring.

6 Claims, 18 Drawing Sheets

(58) Field of Classification Search
CPC ........ F16C 33/80; F16C 41/00; F16C 41/007; F16C 19/06; H02K 7/09; H02K 7/08; H02K 1/145; H02K 11/21; H02K 11/25; H02K 11/35; G01P 3/443; G01P 3/487
USPC ........................................................ 310/90.5
See application file for complete search history.

(56) References Cited

FOREIGN PATENT DOCUMENTS

| | | |
|---|---|---|
| JP | 3-7672 U1 | 1/1991 |
| JP | H03-7672 U1 | 1/1991 |
| JP | 2006-170624 A | 6/2006 |
| JP | 2008-072854 A | 3/2008 |
| JP | 2008-079384 A | 4/2008 |
| JP | 2019-062684 A | 4/2019 |
| JP | 2019-138464 A | 8/2019 |
| JP | 2019-180183 A | 10/2019 |

OTHER PUBLICATIONS

English translation of Written Opinion of the International Search Authority of PCT/JP2021/003613 mailed Apr. 20, 2021 (includes a concise explanation of JPH03-7672, see above).
International Search Report and Written Opinion of PCT/JP2021/003613 mailed Apr. 20, 2021, with English Translation.

\* cited by examiner

BEARING DEVICE, SPACER, AND MANUFACTURING METHOD

CROSS-REFERENCE OF RELATED APPLICATIONS

This application is the U.S. National Phase under 35 U.S.C. § 371 of International Patent Application No. PCT/JP2021/003613, filed on Feb. 2, 2021, which in turn claims the benefit of Japanese Patent Application No. 2020-023669, filed on Feb. 14, 2020, and Japanese Patent Application No. 2021-003421, filed Jan. 13, 2021, the entire disclosures of which Applications are incorporated by reference herein.

TECHNICAL FIELD

The present invention relates to a bearing device, a spacer, and a manufacturing method.

BACKGROUND ART

It is known that a generator combined with a bearing is used as a power source for a sensor, wireless communication, or the like. A bearing with a wireless sensor disclosed in Japanese Patent Laying-Open No. 2006-170624 (PTL 1) includes a rolling bearing, a rotation sensor serving also as a generator, and a wireless transmission circuit that wirelessly transmits an output of the rotation sensor.

CITATION LIST

Patent Literature

PTL 1: Japanese Patent Laying-Open No. 2006-170624

SUMMARY OF INVENTION

Technical Problem

The rotation sensor serving also as a generator, of the bearing with a wireless sensor disclosed in Japanese Patent Laying-Open No. 2006-170624 includes a magnetic encoder and a magnetic ring in which a coil is accommodated. In addition, the magnetic ring functions as a stator of the rotation sensor of the generator. The rotation sensor is configured as a generator of a claw pole type.

The magnetic ring is a ring body having a substantially rectangular cross section in a plane including a rotation axis of the bearing. The magnetic ring is configured by combining two magnetic ring members having a groove-shaped cross-sectional shape opened in a direction of the rotation axis. The two magnetic ring members are arranged such that the two magnetic ring members face each other with their openings facing each other, and the two magnetic ring members are in contact with each other with no gap therebetween in the outer diameter portion. In this manner, by preventing the contact portions of both the magnetic ring members from forming a gap, magnetic resistance at a fitting portion in a magnetic circuit inside the magnetic ring is suppressed to be small.

In the magnetic ring described in PTL 1, it is necessary to prepare two magnetic ring members having different shapes. When the magnetic ring member is press-formed with a die, different dies are required, and therefore initial manufacturing cost increases.

The present invention has been made to solve the above problems, and an object of the present invention is to provide a bearing device, a spacer, and a manufacturing method of these capable of simplifying a configuration of the generator and reducing initial manufacturing cost.

Solution to Problem

The present disclosure relates to a bearing device or a spacer that rotatably supports a rotary member. The bearing device or the spacer includes: a magnetic ring fixed to the rotary member; and a stator fixed to a non-rotary member so as to face the magnetic ring. The magnetic ring and the stator constitute a claw pole type generator. The stator includes: a coil; and a magnetic yoke surrounding the coil. The magnetic yoke is configured by combining a first member and a second member that are magnetic bodies. The first member includes a plurality of first claws arranged in a comb shape. The second member includes a plurality of second claws arranged in a comb shape. The plurality of first claws and the plurality of second claws are alternately arranged on a surface facing the magnetic ring. The first member and the second member have an identical shape.

Advantages Effects of Invention

According to the bearing device or the spacer of the present disclosure, only one type of die for press-forming is required since the two magnetic rings are configured as parts having an identical shape, and therefore it is possible to suppress initial manufacturing cost and to suppress manufacturing cost by eliminating die replacement when the magnetic ring is manufactured.

DESCRIPTION OF EMBODIMENTS

Figure 1:
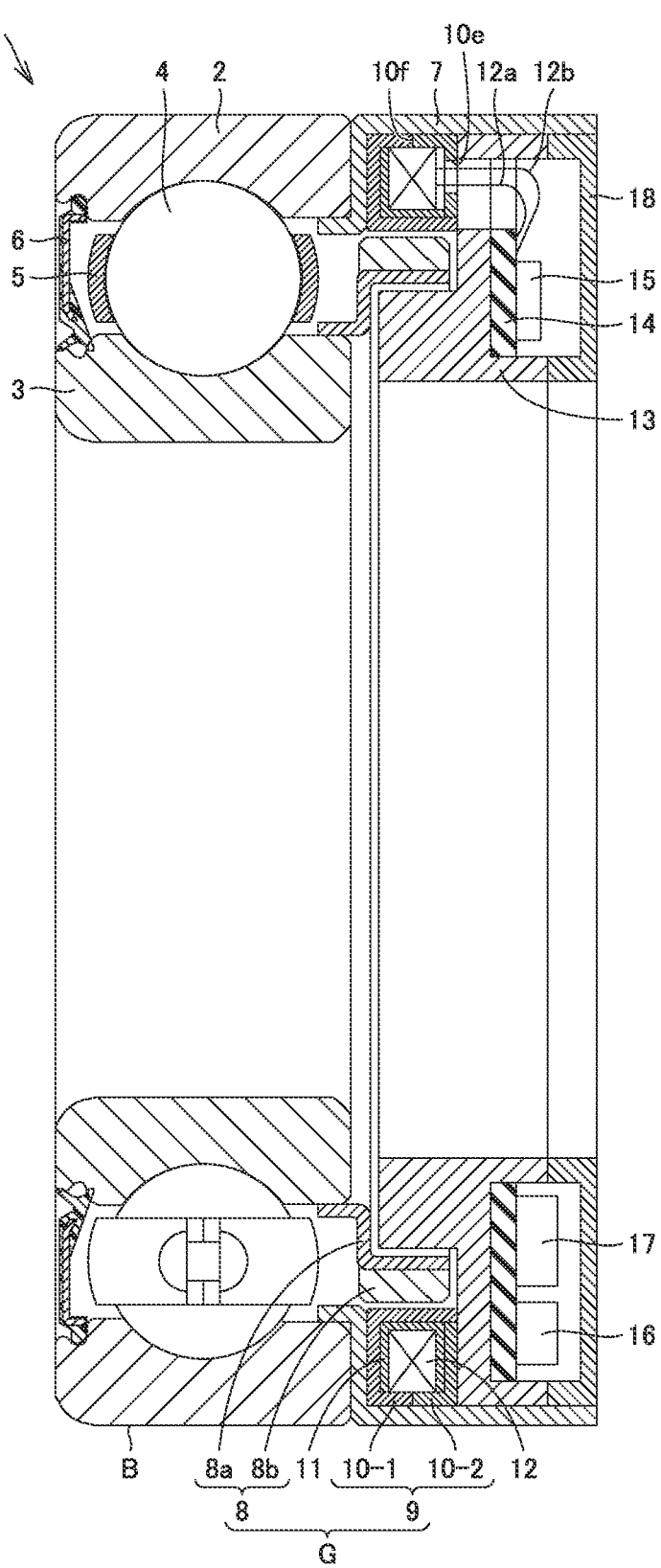
FIG. 1 is a cross-sectional view of a bearing device according to a first embodiment.

Hereinafter, embodiments of the present invention will be described with reference to the drawings. In the following drawings, the same or corresponding parts are denoted by the same reference numerals, and description thereof will not be repeated.

First Embodiment

FIG. 1 is a cross-sectional view of a bearing device according to a first embodiment in a plane including a rotation axis. A bearing with a wireless sensor is exemplified as a bearing device 1 illustrated in FIG. 1. Bearing device 1 includes a bearing B, an external ring 7, a magnetic ring 8, and a stator 9. Bearing B includes an outer ring 2, an inner ring 3, rolling elements 4, a retainer 5, and a seal 6. External ring 7 is fixed to an inner diameter surface of outer ring 2. Magnetic ring 8 is fixed to an outer diameter surface of inner ring 3. Stator 9 is fixed to the inner diameter surface of external ring 7 so as to face magnetic ring 8.

Magnetic ring 8 and stator 9 constitute a generator G. Generator G is a claw pole generator. Bearing B is, for example, a deep groove ball bearing in which rolling elements 4 are balls. Here, an inner ring rotation type in which inner ring 3 is a rotating wheel and outer ring 2 is a fixed wheel will be described as an example.

Magnetic ring 8 includes a cored bar 8a and a multipolar magnet 8b. Multipolar magnet 8b is obtained by, for example, vulcanizing and bonding a magnetic material obtained by kneading magnetic powder and rubber to cored bar 8a, and then alternately magnetizing N poles and S poles, and is fixed to inner ring (rotating wheel) 3.

Stator 9 includes two magnetic ring members 10-1 and 10-2 having the same shape, a bobbin 11, and a coil 12. The winding of coil 12 is wound a plurality of times in the circumferential direction of bobbin 11. Although an example of using bobbin 11 is illustrated here, a stator can be similarly configured even if a coil not using bobbin 11 is used.

A resin case 13 is fixed to the inner diameter surface of external ring 7 so as to be adjacent to generator G. Circuit board 14 is fixed to case 13. Circuit board 14 is provided with a power circuit 15 that rectifies AC power generated by generator G and converts the AC power into DC power, a sensor 16 that monitors a state of bearing B, and a wireless communication circuit 17 that wirelessly transmits an output of sensor 16 to the outside. An end portion 12a that is a start of winding of coil 12 and an end portion 12b that is an end of winding of the coil are connected to circuit board 14.

When inner ring 3 rotates, AC power output from generator G is converted into DC by power circuit 15. A lid 18 that protects circuit board 14 is made of a nonmagnetic insulator such as resin, and is fixed to external ring 7, for example. A surface of circuit board 14 may be sealed with a resin molding agent instead of lid 18.

Circuit board 14 on which wireless communication circuit 17 is mounted is surrounded by a nonmagnetic insulator such as resin. Since a magnetic material or a conductor is not disposed on a side of lid 18 of circuit board 14, wireless communication is possible.

Further, case 13 is interposed between bearing B and circuit board 14. Although the temperature of bearing B may rise due to friction during rotation, if case 13 is made of a resin material having a low thermal conductivity, it is also possible to suppress rise of the temperature of circuit board 14. For example, when a material having excellent heat insulating properties, such as resin containing fine bubbles, is used, it is effective to suppress the temperature rise.

Although seal 6 is not mounted on a side of bearing B to which magnetic ring 8 is fixed, making a gap between magnetic ring 8 and components such as stator 9 and case 13 narrowed provides a labyrinth seal (non-contact seal) structure, and thus it is possible to prevent foreign matters and the like from entering. In order to improve sealing characteristics as necessary, a groove or the like may be provided on any of the opposing surfaces, or a contact type seal may be provided.

Figure 2:
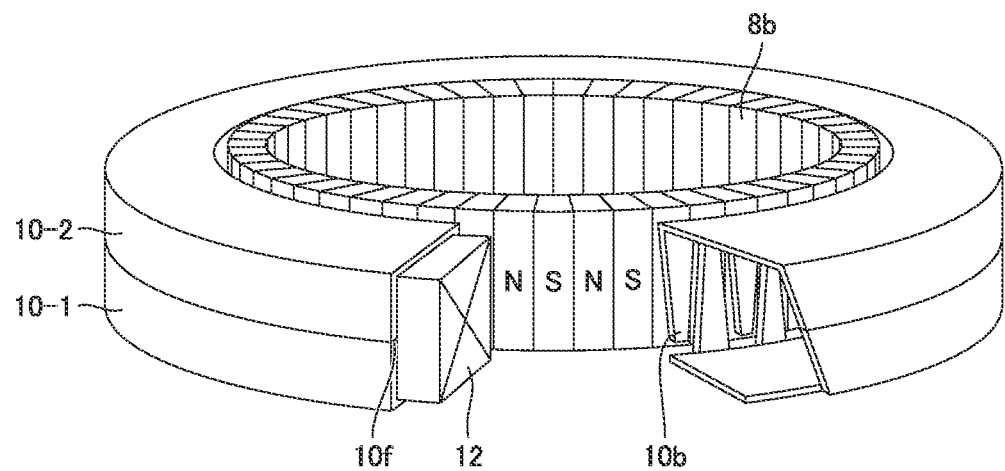
FIG. 2 is a diagram illustrating a schematic configuration of a generator G.

FIG. 2 is a diagram illustrating a schematic configuration of generator G. Generator G is a claw pole type generator. A magnetic rotor includes a ring-shaped multipolar magnet 8b. Further, stator 9 includes coil 12 and a magnetic yoke surrounding the coil. The magnetic yoke includes magnetic ring members 10-1 and 10-2. A magnetic flux emitted from the N pole of multipolar magnet 8b enters the magnetic yoke from a claw 10b which is a magnetic pole, goes around the coil, and enters the S pole of multipolar magnet 8b from claw 10b which is an adjacent magnetic pole. When the positions of the N pole and the S pole of multipolar magnet 8b are switched depending on a rotation angle of the magnetic rotor, directions of the magnetic fluxes are reversed. The alternating magnetic fields generated in this manner generate an AC voltage at both ends of coil 12.

Figure 3:
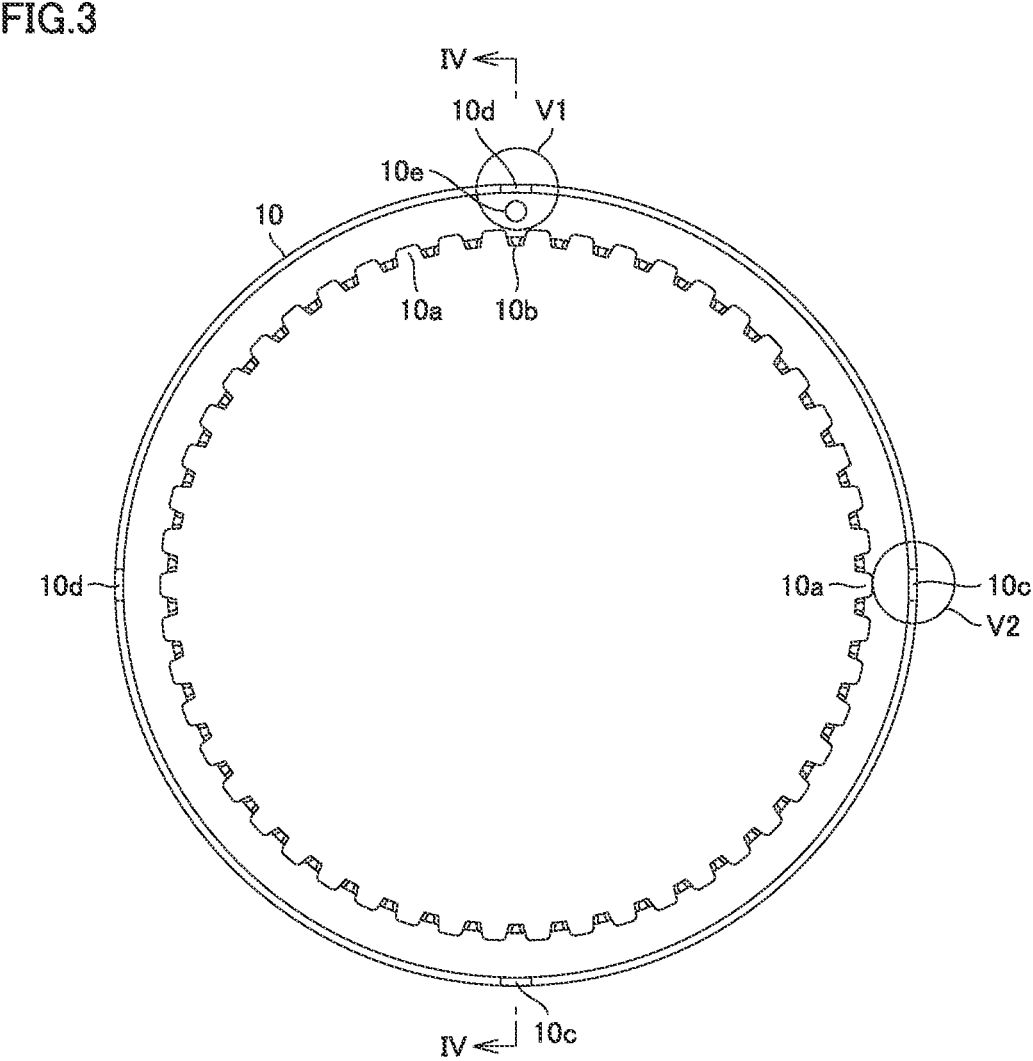
FIG. 3 is a side view of a magnetic ring member 10.
Figure 4:
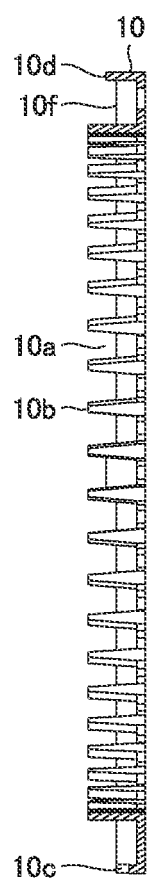
FIG. 4 is a cross-sectional view taken along line IV-IV of FIG. 3.

FIG. 3 is a side view of a magnetic ring member 10. FIG. 4 is a cross-sectional view taken along line IV-IV of FIG. 3. Referring to FIGS. 3 and 4, at one end of magnetic ring member 10, grooves 10a and claws 10b opened in an axial direction are alternately arranged in a comb shape.

A recess 10c and a protrusion 10d are provided on an end surface 10f of magnetic ring member 10. When two magnetic ring members 10-1 and 10-2 having an identical shape are opposed to each other and claws 10b are alternately arranged, positions of recess 10c and protrusion 10d are designed such that protrusion 10d of one magnetic ring member 10-2 is arranged with respect to recess 10c of the other magnetic ring member 10-1.

Although at least one recess 10c and one protrusion 10d are sufficient, a plurality of recesses and protrusions may be provided as illustrated in FIG. 3. For example, assembly is possible as long as protrusion 10d illustrated in a circle V1 and recess 10c illustrated in a circle V2 in FIG. 3 are provided. However, in the present embodiment, two recesses 10c and two protrusions 10d are provided in FIG. 3 in consideration of the balance at the time of assembly.

In addition, a hole 10e provided in the side surface is provided in magnetic ring member 10 in order to pull out end portions 12a and 12b of coil 12 to the outside.

Figure 5:
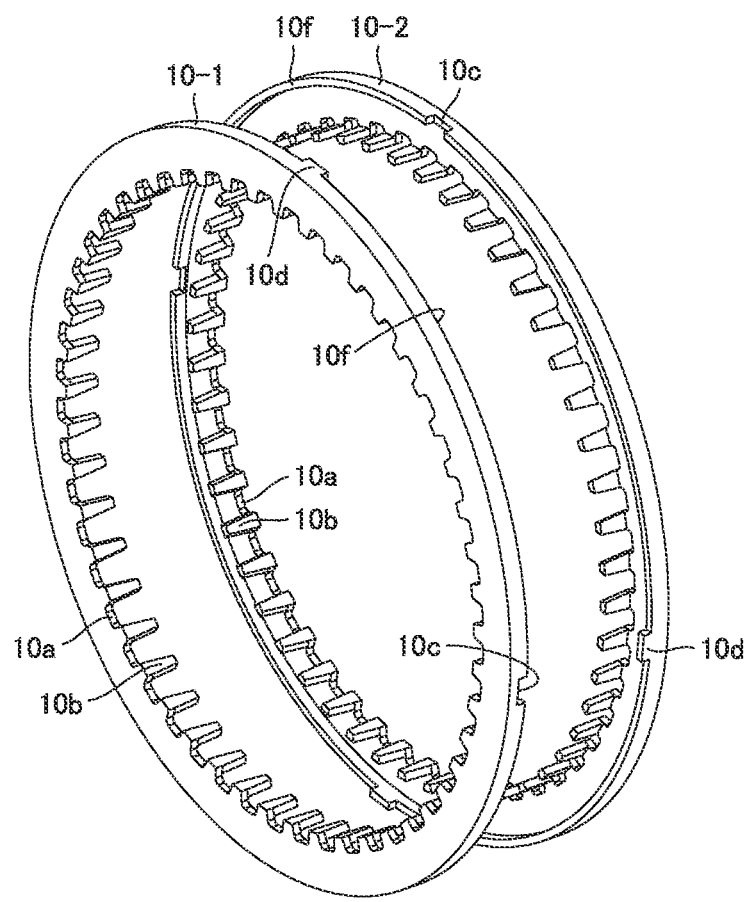
FIG. 5 is a view illustrating a state in which two magnetic ring members 10 having the same shape are arranged to face each other.

FIG. 5 is a view illustrating a state in which two magnetic ring members 10 having the same shape are arranged to face each other.

In practice, bobbin 11 wound with coil 12 is accommodated in a space between two magnetic ring members 10-1 and 10-2, but bobbin 11 wound with coil 12 is not illustrated here because the drawing becomes complicated.

Figure 6:
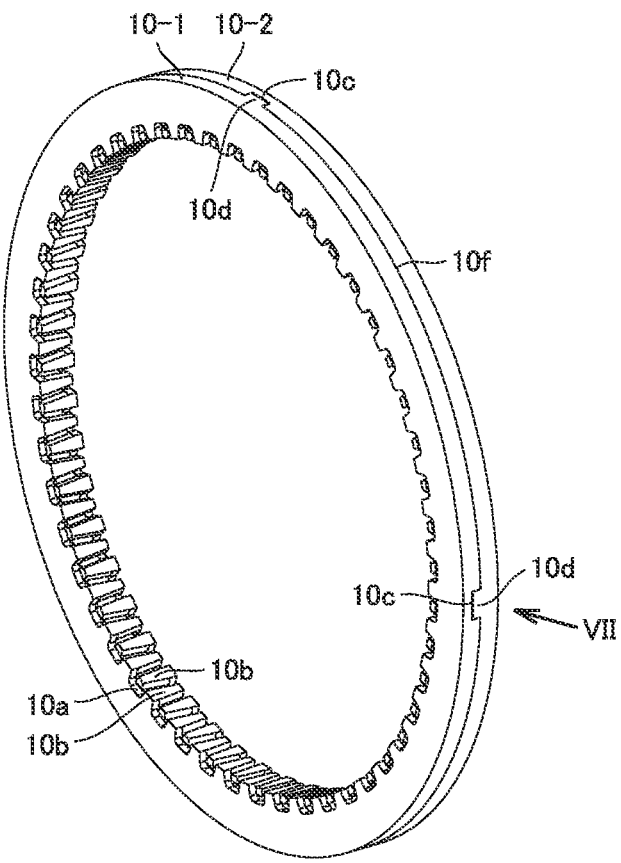
FIG. 6 is a view illustrating a state in which two magnetic ring members 10 are fitted.

The number of magnetic poles of magnetic ring 8 including the N pole and the S pole is the same as that of claw 10b in the state of FIG. 6.

Figure 7:
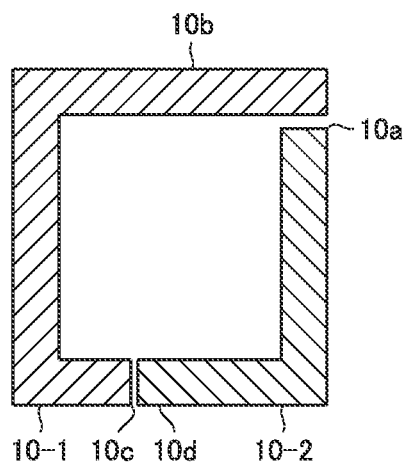
FIG. 7 is a cross-sectional view at VII in FIG. 6 after fitting of the two magnetic ring members.

FIG. 6 is a view illustrating a state in which two magnetic ring members 10 are fitted. FIG. 7 is a cross-sectional view of a portion VII in FIG. 6 after fitting of the two magnetic ring members on a plane including the rotation axis of the bearing. Although bobbin 11 and coil 12 are arranged inside the stator as in FIG. 1 and the like, bobbin 11 and coil 12 are not illustrated in FIG. 7.

Two magnetic ring members 10-1, 10-2 of the same shape are used. Recess 10c and protrusion 10d provided on end surface 10f of each magnetic ring member 10 are fitted so that claws 10b provided on each magnetic ring member 10 are alternately arranged.

On end surface 10f of magnetic ring member 10, the same number of recesses 10c and protrusions 10d are provided. When recesses 10c and protrusions 10d are fitted and end surfaces 10f are brought into contact with each other, it is easy to align the phases of the arrangements so that a gap between claw 10b and claw 10b of respective magnetic ring members 10 become uniform. In addition, since the plurality of recesses 10c and the plurality of protrusions 10d are arranged in the circumferential direction, the positions of magnetic ring members 10 can be fixed without being displaced from each other in the circumferential direction.

End surfaces 10f of two magnetic ring members 10 come into contact with each other without a gap and provide a magnetic path. However, even if a gap is generated, as long as external ring 7 is made of a magnetic material, external ring 7 can be used as a magnetic path, and the magnetic resistance of the magnetic yoke can be suppressed to be small.

By providing two magnetic ring members 10-1 and 10-2 as components having an identical shape, only one type of die is required for press-forming, and the initial manufacturing cost can be kept low. In addition, since the number of man-hours for replacing the die is reduced at the time of manufacturing the magnetic ring, the manufacturing cost can also be suppressed.

Furthermore, by providing recess 10c and protrusion 10d, phase matching between the two magnetic rings at the time of assembly is facilitated, and claws 10b can be arranged with uniform gaps, and thus assembly is facilitated.

In addition, since recess 10c and protrusion 10d provided in two magnetic ring members 10 are fitted to each other, two magnetic ring members 10 can be easily assembled without adhesion or welding.

In order to fit more firmly, plastic working such as caulking (not illustrated) may be added to the fitting portion, or the fitting portion may be elastically deformed. When the magnetic resistance at the fitting portion of two magnetic ring members 10 is further reduced by the firm fitting as described above, power generation performance is improved.

In a case of magnetic ring members 10 shown in FIGS. 2 to 7, since outer diameters of two magnetic ring members 10-1 and 10-2 disposed opposite to each other are substantially the same, end surface 10f can be firmly brought into contact with each other, and the magnetic resistance is reduced. In addition, since there is no step in the outer diameter, assembly work of inserting stator 9 into external ring 7 is facilitated.

Note that magnetic ring member 10 is generally manufactured by press-forming a thin plate of a magnetic material with a die, but other than this method, the magnetic material may be deposited on the surface by plating, electrodeposition, or the like after injection molding of a resin material. In this manufacturing method, it is easy to manufacture even a fine claw shape that is difficult to plastically process by pressing.

Also, in this manufacturing method, since only one type of injection molding mold is required, it is possible to suppress the initial manufacturing cost.

Figure 8:
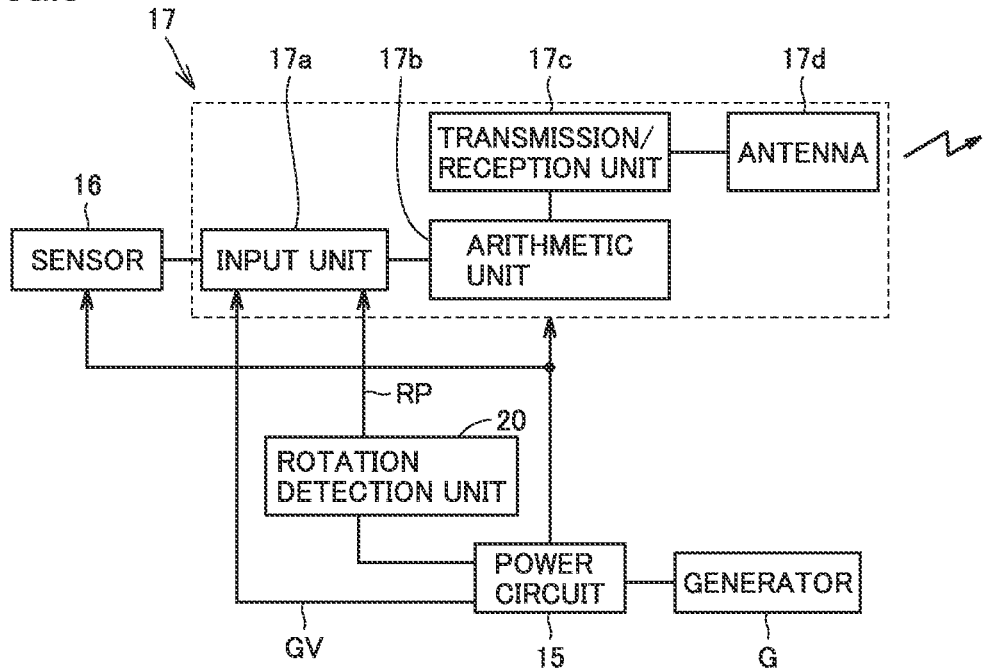
FIG. 8 is a diagram illustrating a configuration of a circuit board 14.

FIG. 8 is a diagram illustrating a configuration of circuit board 14. Circuit board 14 is provided with power circuit 15, sensor 16, and wireless communication circuit 17. Power circuit 15 smooths an alternating current obtained from generator G into a direct current, and boosts or steps down the alternating current at a subsequent stage to generate a DC power supply GV for driving sensor 16 and wireless communication circuit 17. Since a frequency of an AC signal obtained from generator G changes according to the rotation speed of inner ring 3, a rotation detection unit 20 can process the AC signal to obtain a rotation signal RP.

For example, when a signal obtained by half-wave rectifying an AC signal with a diode is input to the base of a transistor, a rotation pulse signal corresponding to the rotation speed is obtained, and the rotation speed can be detected. Rotation detection unit 20 may be such a transistor.

Sensor 16 is, for example, a temperature sensor or an acceleration sensor that monitors the state of bearing B. In FIG. 1, sensor 16 is mounted on circuit board 14, but the temperature sensor may be fixed in contact with or in the vicinity of outer ring 2 so as to directly measure the temperature of bearing B, and a sensor signal may be input to circuit board 14.

Wireless communication circuit 17 includes an input unit 17a that inputs a sensor signal, an arithmetic unit 17b that performs arithmetic processing on the sensor signal, a transmission/reception unit 17c for transmitting and receiving data, and an antenna 17d. For example, when the sensor output is an analog voltage, input unit 17a may include a DA converter. With such a configuration, by converting the sensor output into a digital signal in the immediate vicinity of sensor 16, it is possible to suppress mixing of electromagnetic noise.

In addition, arithmetic unit 17b has functions of a central processing unit (CPU) and a memory, and performs arithmetic processing on information obtained from sensor 16.

Wireless communication circuit 17 is, for example, a module compatible with a wireless standard such as Bluetooth (registered trademark) or Bluetooth Low Energy (registered trademark). In a case where the generated power is small, wireless communication circuit 17 is preferably a circuit that can be driven with low power. Here, wireless communication circuit 17 may be a communication circuit other than the wireless standards described above.

It is also assumed that the presence of a magnetic material in the vicinity of antenna 17d affects wireless communication. However, in the present embodiment, since circuit board 14 is fixed via case 13 made of a nonmagnetic material, a distance between antenna 17d and a magnetic material such as stator 9 can be increased, and therefore an influence on wireless communication is reduced. In addition, by preventing stator 9 from being arranged on a back side of wireless communication circuit 17, the influence on the wireless communication can be further reduced.

The signal of sensor 16 may be processed into an index according to a purpose, such as a result of calculation of an average value by arithmetic unit 17b or a maximum value and a minimum value within a certain period of time, and then transmitted. By processing the signal of sensor 16 by arithmetic unit 17b, the amount of transmission data can be reduced, the number of communications can be reduced, and power consumption can be suppressed.

Figure 9:
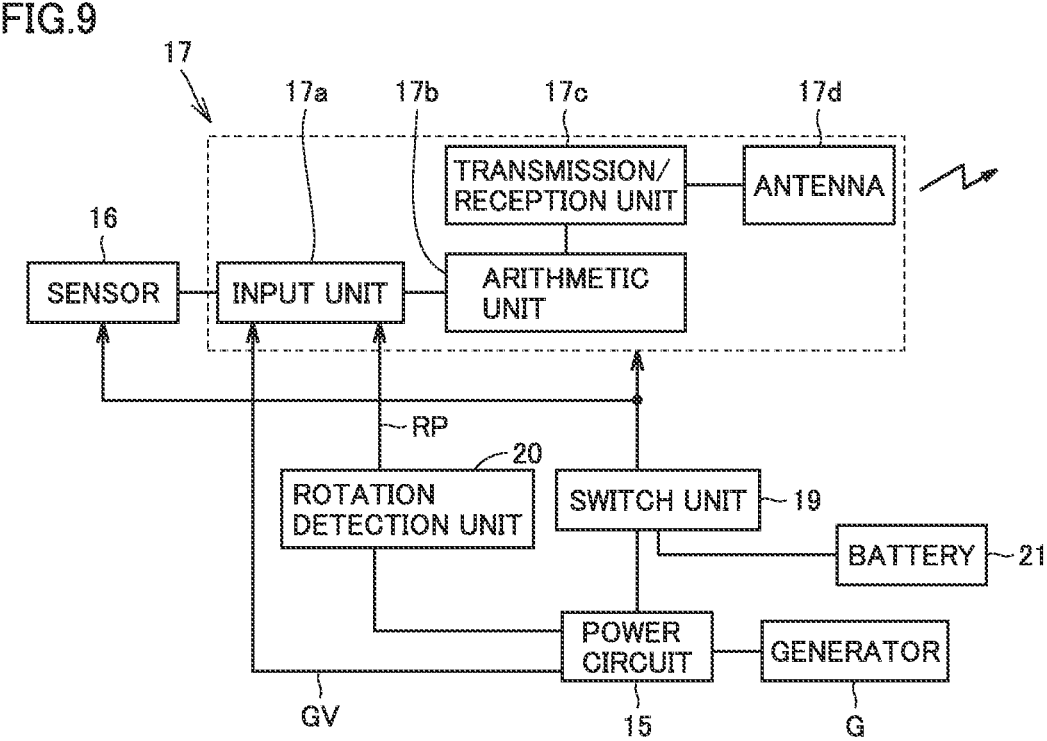
FIG. 9 is a diagram illustrating an improved example of circuit board 14 of FIG. 8.

FIG. 9 is a diagram illustrating an improved example of circuit board 14 of FIG. 8. When generator G using the rotation of inner ring 3 is used, necessary electric power cannot be secured unless inner ring 3 rotates at a certain speed or more. Therefore, in FIG. 9, a battery 21 is mounted in addition to generator G. As such a configuration, when the power required by generator G cannot be secured, the power may be switched to the battery drive by a switch unit 19 and used. In addition, power generated by generator G may be stored in battery 21, and data may be intermittently transmitted after a sufficient amount of power is stored.

In this way, even when inner ring 3 rotates at a low speed or stops, the signal of sensor 16 can be transmitted, and bearing B can be constantly monitored.

First Modification of First Embodiment

Figure 10:
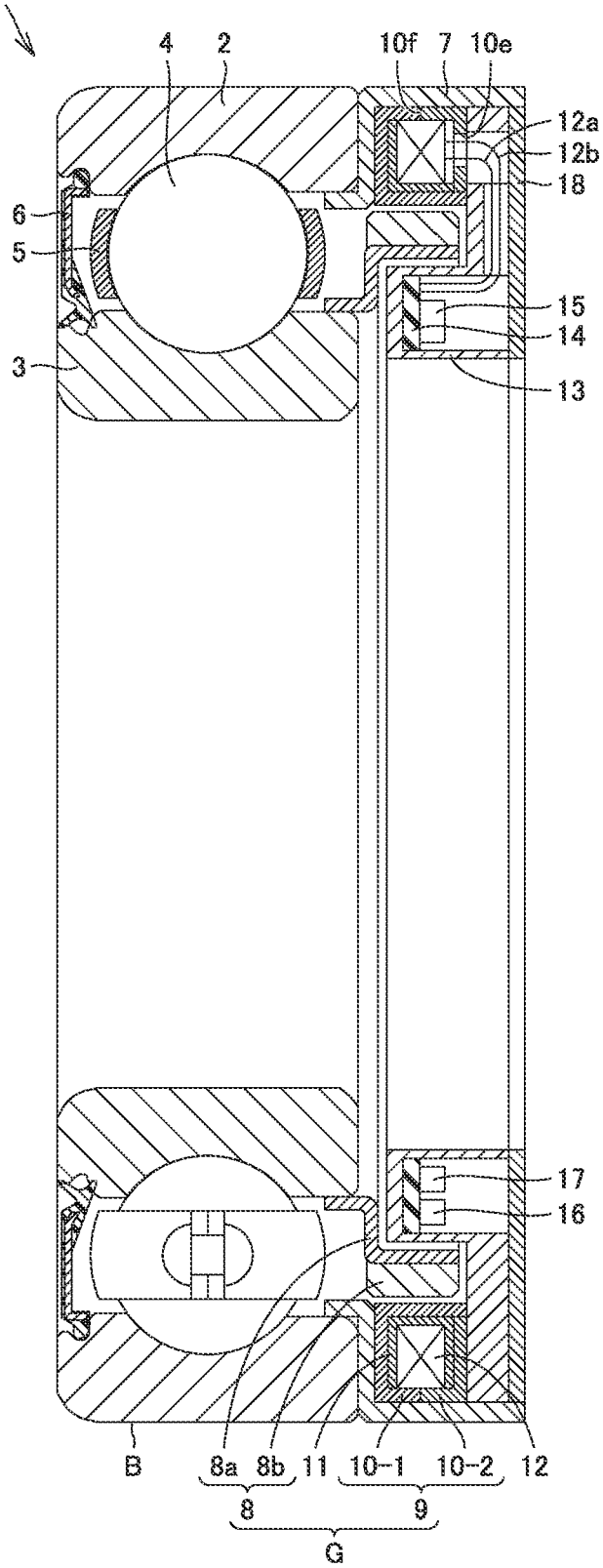
FIG. 10 is a cross-sectional view of a bearing device 1A according to a first modification of the first embodiment.

FIG. 10 is a cross-sectional view of a bearing device 1A according to a first modification of the first embodiment in a plane including a rotation axis. Bearing device 1A is a bearing with a wireless sensor as an improved example of FIG. 1. In FIG. 10, case 13 is disposed so as to be inserted into an inner diameter portion of magnetic ring 8, and circuit board 14 is disposed inside the case. Therefore, a width in the axial direction can be reduced as compared with the example of FIG. 1, and magnetic ring 8 can be made compact.

Figure 11:
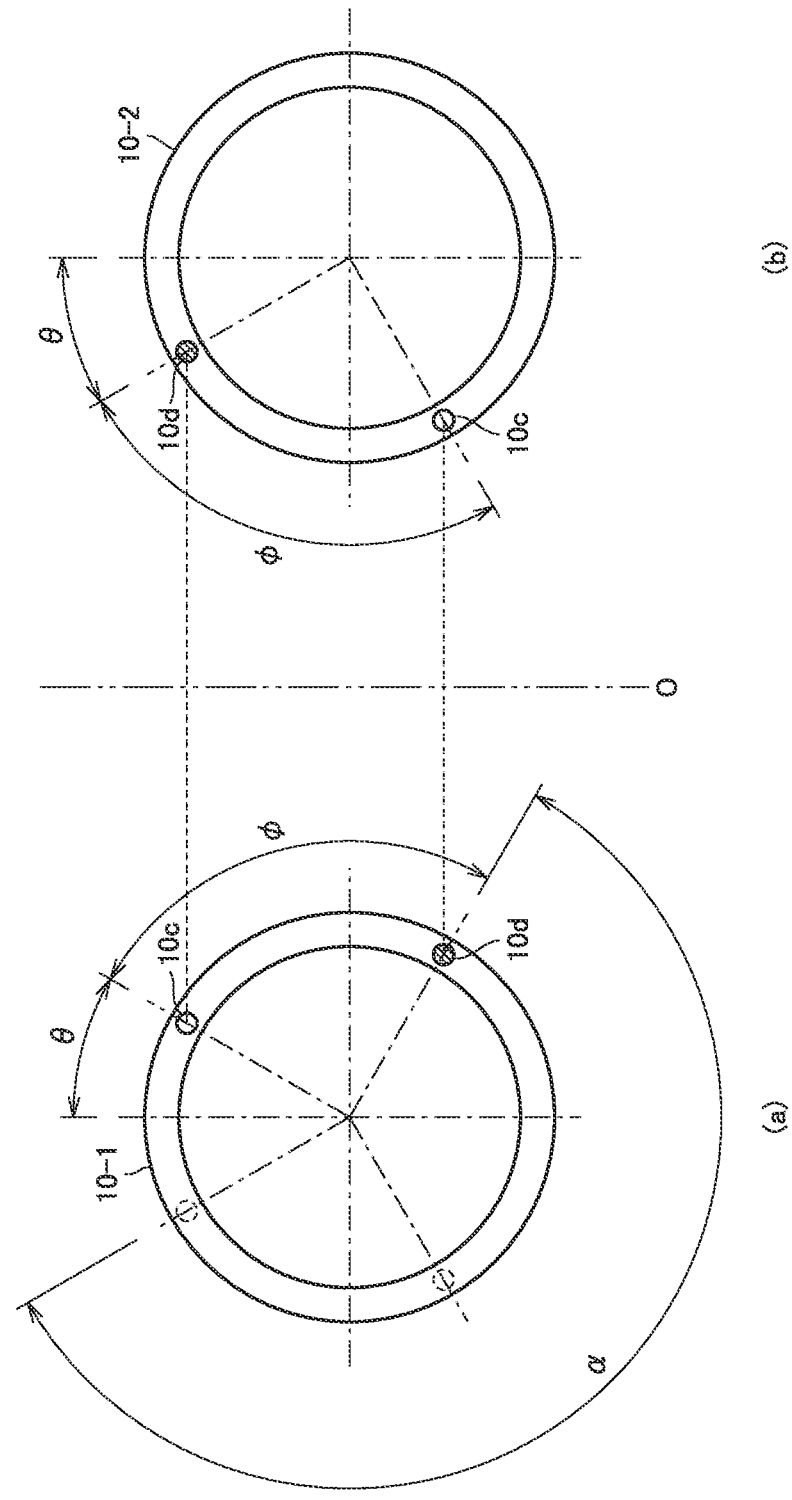
FIG. 11 is a view for illustrating a condition for fitting a recess 10c and a protrusion 10d.

FIG. 11 is a view for illustrating a condition for correspondingly fitting recess 10c and protrusion 10d provided for two magnetic ring members 10.

In order to simplify the drawing, recess 10c is indicated by a white circle, and protrusion 10d is indicated by a hatched circle.

FIG. 11(a) is a view of magnetic ring member 10-1 viewed from the side of recess 10c and protrusion 10d, and shows an example in which one recess 10c and one protrusion 10d are provided. Recess 10c is provided at a position of θ from the reference position, and protrusion 10d is provided at a position of φ from recess 10c.

FIG. 11(b) is a view illustrating arrangement of magnetic ring member 10-2. The arrangement of magnetic ring member 10-2 corresponds to the arrangement obtained by rotating FIG. 11(a) clockwise by an angle α so as to be line-symmetric with respect to a line O. When bent along line O, recess 10c provided in magnetic ring member 10-1 and protrusion 10d provided in magnetic ring member 10-2 are fitted, and recess 10c provided in magnetic ring member 10-2 and protrusion 10d provided in magnetic ring member 10-1 are fitted.

In order for recess 10c and protrusion 10d to be fitted to each other, it is necessary to satisfy the following Formula (1).

$$\alpha = 2\pi - 2\theta - \varphi \quad (1)$$

Figure 12:
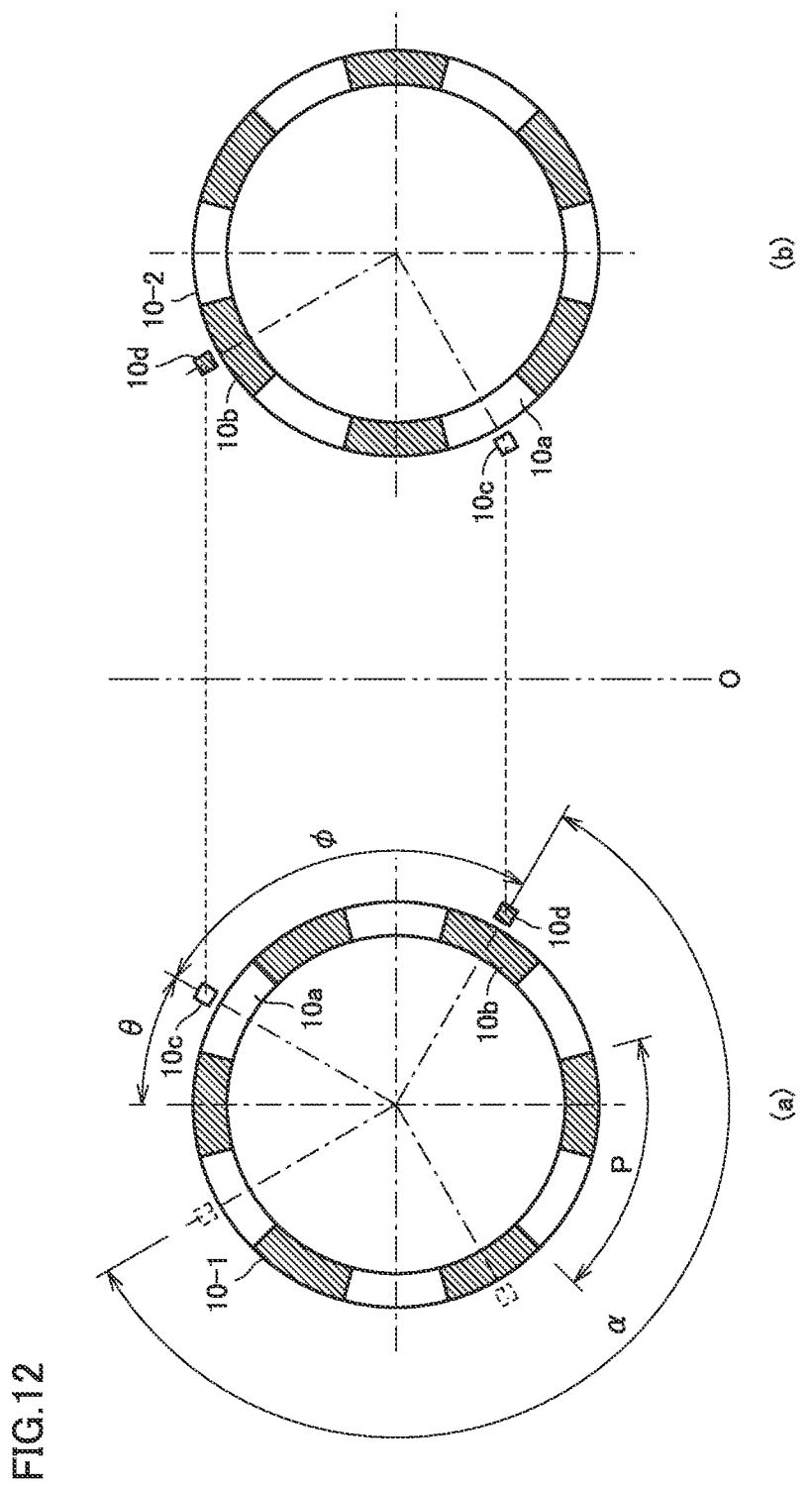
FIG. 12 is a view illustrating a phase in which grooves 10a and claws 10b fit alternately.

FIG. 12 is a view illustrating a phase of two magnetic ring members 10 in which groove 10a and claw 10b fit alternately. FIG. 12(a) illustrates arrangement of the groove and the claw of magnetic ring member 10-1. FIG. 12(b) illustrates arrangement of the groove and the claw of magnetic ring member 10-1. The state illustrated in FIG. 12(b) corresponds to a state of being rotated at angle α from the state of FIG. 12(a).

In order for grooves 10a and claws 10b to be alternately fitted when bent along line O, it is necessary to satisfy relationship shown in the following Formula (2).

$$\alpha = (i + \tfrac{1}{2}) \cdot 2\pi/n \quad (2)$$

In the above, i represents an integer indicating the number of pitches to be shifted at the time of fitting, n represents the number of grooves 10a and claws 10b of magnetic ring member 10, and 2π/n represents a pitch P of the claws. In order to shift by ½ pitch so that the claws are alternately arranged, ½ is added to i in Formula (2).

Since α in Formula (1) is equal to α in Formula (2), the following Formula (3) is obtained by solving these formulas for i.

$$i = n/2\pi(2\pi - 2\theta - \varphi - \pi/n) \quad (3)$$

That is, as the positions of recess 10c and protrusion 10d, φ may be selected such that the right side of Formula (3) is an integer with respect to number n of grooves 10a and claws 10b. For example, assuming that θ=π/6, φ=π/2, and n=6, then i=3.

Figure 13:
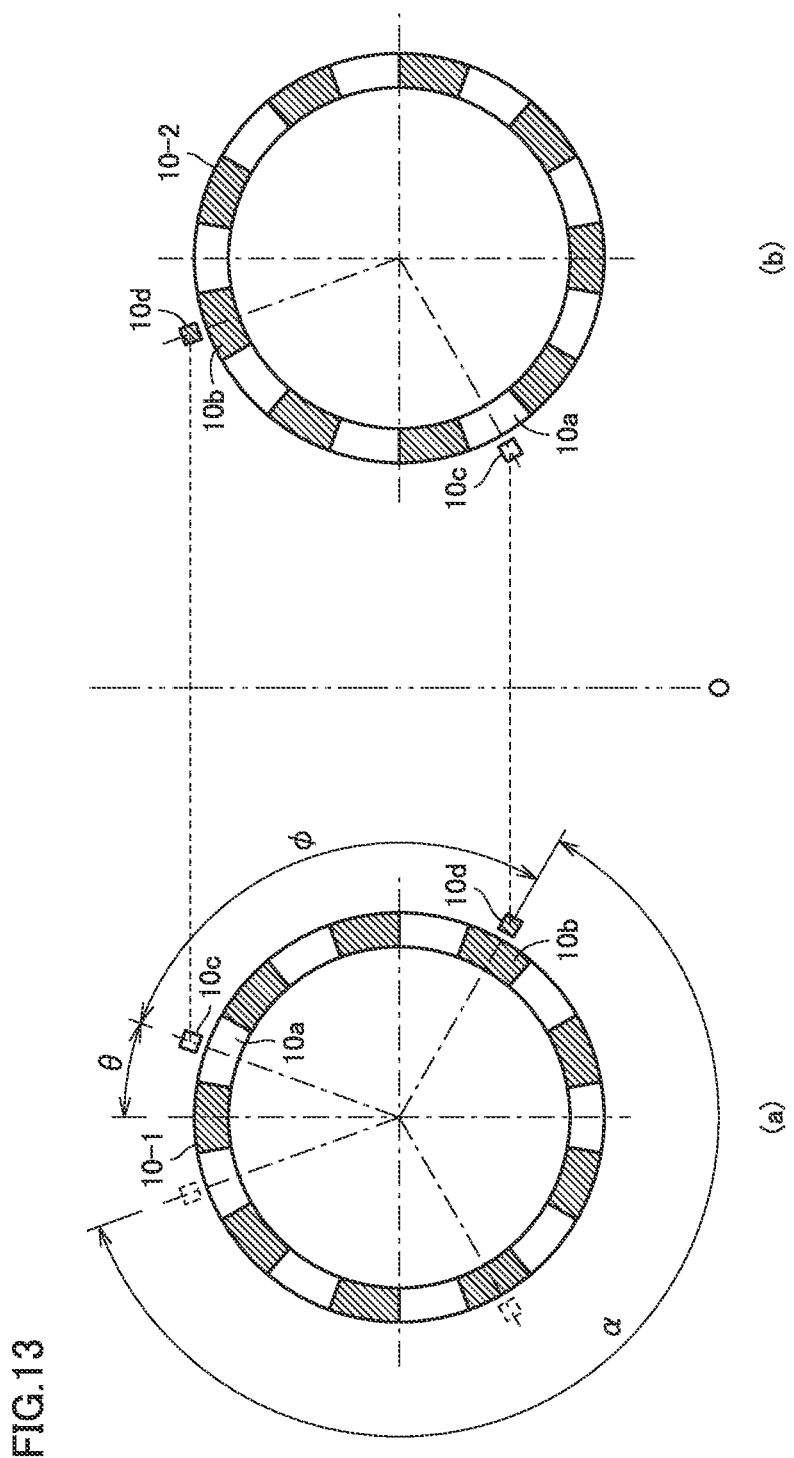
FIG. 13 is a view of another example in which a number n of grooves 10a and claws 10b is an odd number.

FIG. 13 is a diagram illustrating another example in which number n of grooves 10a and claws 10b is an odd number. In the example illustrated in FIG. 13, assuming that θ=π/9, n=9, and φ=5π/9, then i=5.

Second Modification of First Embodiment

The above embodiment has described the example in which outer ring 2 of bearing B is fixed to the stationary member, inner ring 3 is fixed to the rotary member, and the rotary member is supported with respect to the stationary member. However, the present invention can be similarly applied to a case where the outer ring is rotational and the inner ring is stationary.

Figure 14:
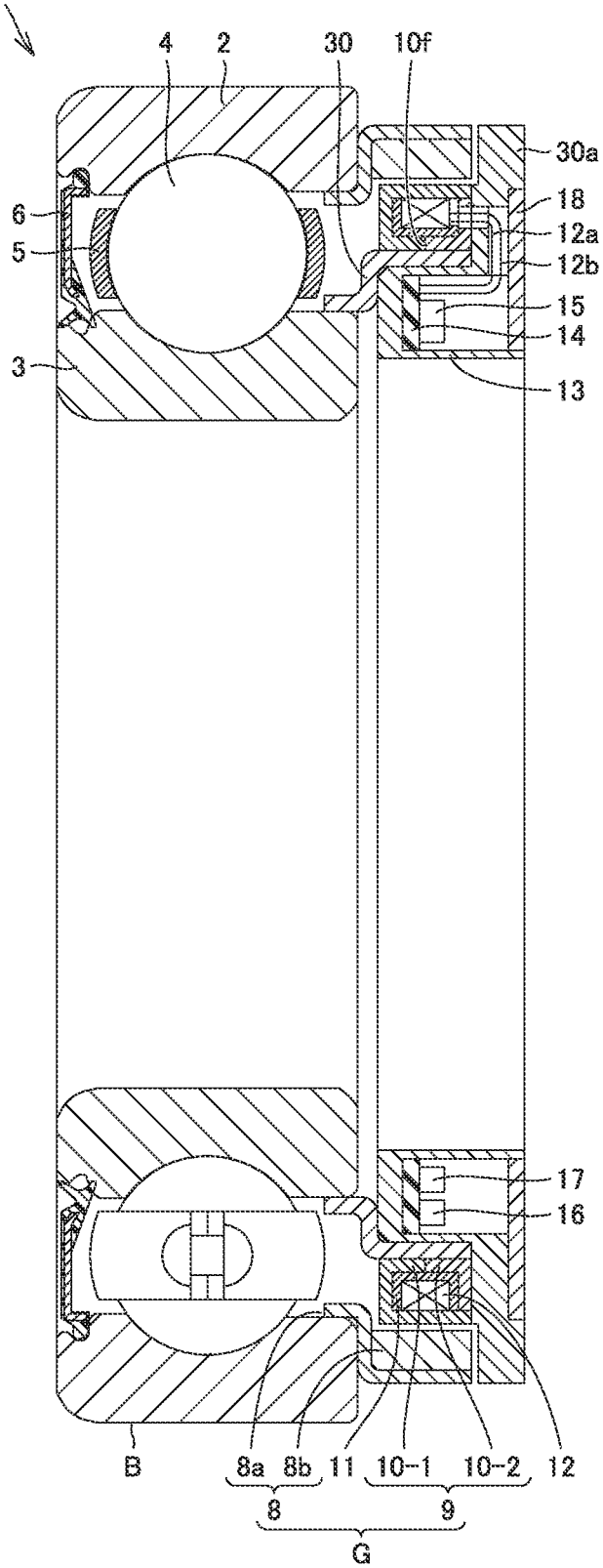
FIG. 14 is a cross-sectional view of a bearing device 1B according to a second modification of the first embodiment.

FIG. 14 is a cross-sectional view of a bearing device 1B according to a second modification of the first embodiment in a plane including the rotation axis of bearing device 1B. Bearing device 1B is a modification of bearing device 1A illustrated in FIG. 10, and is a bearing with a wireless sensor in which the outer ring is rotational.

In FIG. 14, magnetic ring 8 is fixed to an inner diameter portion of outer ring 2, and multipolar magnet 8b is provided on a side of an inner diameter of cored bar 8a. A ring member 30 is fixed to an outer diameter surface of inner ring 3 serving as a fixed wheel. Stator 9 is fixed to a side of an outer diameter of ring member 30, and case 13 is fixed to a side of an inner diameter of the ring member. In FIG. 14, since the outer periphery of stator 9 faces magnetic ring 8, the claws aligned in a comb shape are arranged on the outer periphery of stator 9.

Case 13 has a flange portion 30a protruding toward on the side of the outer diameter. A labyrinth structure in which a gap between flange portion 30a and magnetic ring 8 is narrowed is provided. The labyrinth structure prevents a foreign matter from entering.

Circuit board 14 is fixed in the groove provided in case 13. Circuit board 14 is provided with power circuit 15 that rectifies AC power generated by generator G and converts the AC power into DC power, sensor 16 that monitors a state of bearing B, and wireless communication circuit 17 that wirelessly transmits an output of sensor 16 to the outside.

End portion 12a that is the start of winding and end portion 12b that is the end of winding drawn from coil 12 are connected to circuit board 14. The AC power output from generator G when outer ring 2 rotates is converted into DC by power circuit 15. Lid 18 that protects circuit board 14 is made of a nonmagnetic insulator such as resin, and closes the opening of case 13. The surface of circuit board 14 may be sealed with a resin molding agent instead of lid 18.

Even if the rotating wheel is outer ring 2, the width in the axial direction can be reduced and outer ring 2 can be made compact with the structure illustrated in FIG. 14.

Second Embodiment

The first embodiment has described an example in which two magnetic ring members having an identical shape are combined to provide a magnetic ring. In a second embodiment, another example is shown in which two magnetic ring members having an identical shape are similarly combined to provide a magnetic ring. Portions other than the magnetic ring are similar to the configuration described in the first embodiment, and thus only the magnetic ring will be described below.

Figure 15:
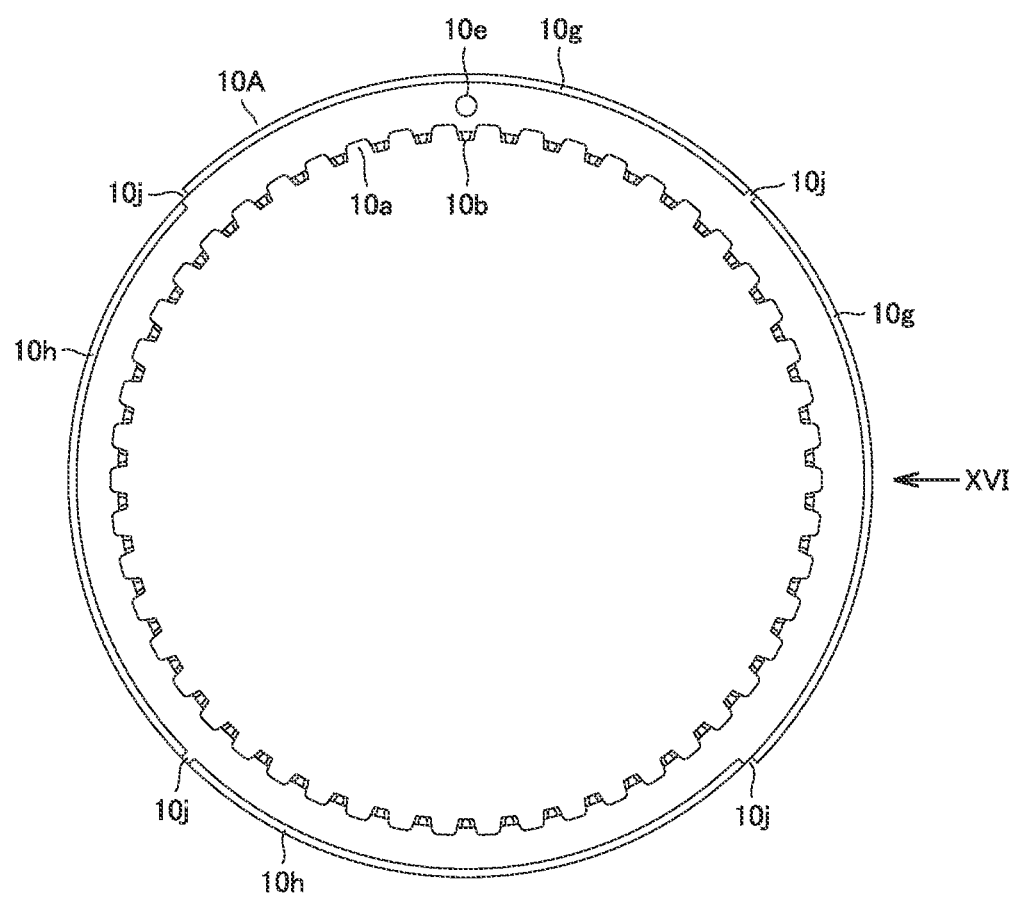
FIG. 15 is a side view of a magnetic ring member 10A used in a second embodiment.
Figure 16:
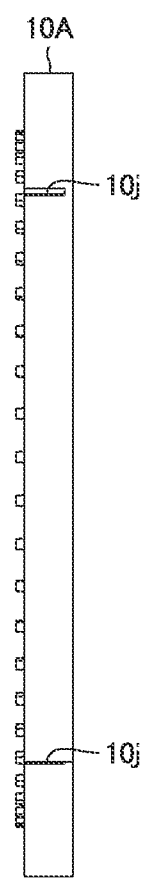
FIG. 16 is a view of magnetic ring member 10A shown in FIG. 15 seen along an XVI arrow.

FIG. 15 is a side view of a magnetic ring member 10A used in the second embodiment. FIG. 16 is a view of magnetic ring member 10A shown in FIG. 15 seen along an XVI arrow.

Referring to FIGS. 15 and 16, grooves 10a and claws 10b opened in the axial direction are alternately arranged in a comb shape at one end of magnetic ring member 10A. A plurality of large-diameter portions 10g and small-diameter portions 10h having different outer diameters are provided at the other end. The number of large-diameter portions 10g is equal to the number of small-diameter portions 10h. A cutout portion 10j is provided at a boundary between large-diameter portion 10g and small-diameter portion 10h. FIG. 15 illustrates an example in which two large-diameter portions 10g and two small-diameter portions 10h are disposed.

Figure 17:
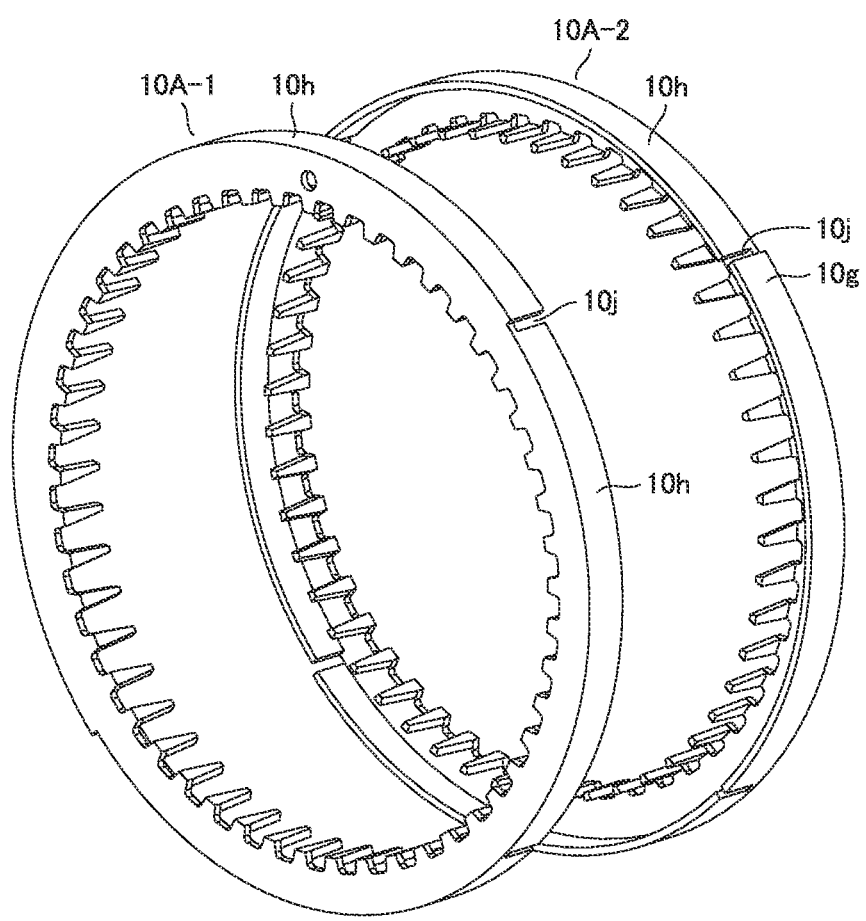
FIG. 17 illustrates a state in which two magnetic ring members 10A having the same shape are arranged to face each other.
Figure 18:
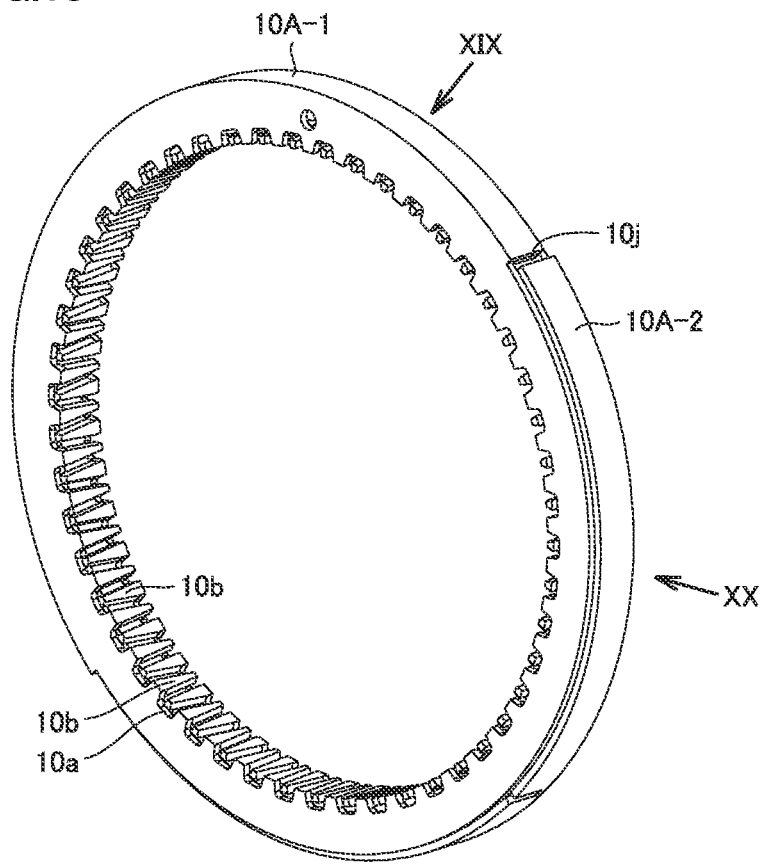
FIG. 18 illustrates a state in which two magnetic ring members 10A are fitted.

FIG. 17 illustrates a state in which two magnetic ring members 10A having the same shape are arranged to face each other. FIG. 18 illustrates a state in which two magnetic ring members 10A are fitted.

When two magnetic ring members 10A-1 and 10A-2 having an identical shape are opposed to each other and claws 10b are alternately arranged, large-diameter portion 10g of magnetic ring member 10A-1 is fitted to small-diameter portion 10h of magnetic ring member 10A-2. Small-diameter portion 10h of magnetic ring member 10A-1 is fitted to large-diameter portion 10g of magnetic ring member 10A-2.

When two magnetic ring members 10A and 10A are fitted to each other, if respective cutout portions 10j are fitted to each other, respective claws 10b do not come into contact with each other and are arranged with a constant gap.

Hole 10e provided in the side surface of magnetic ring member 10 is provided to pull out end portions 12a and 12b of coil 12 to the outside.

In practice, bobbin 11 wound with coil 12 is accommodated in a space sandwiched between two magnetic ring members 10A-1 and 10A-2. However, since the drawing becomes complicated, bobbin 11 wound with coil 12 is not illustrated here.

The number of magnetic poles of magnetic ring 8 including the N pole and the S pole is the same as that of claw 10b in the state of FIG. 18.

Figure 19:
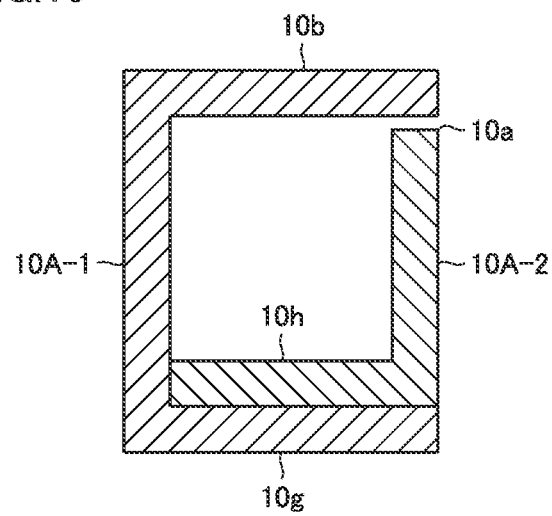
FIG. 19 is a cross-sectional view of a stator on a plane including a rotation axis.
Figure 20:
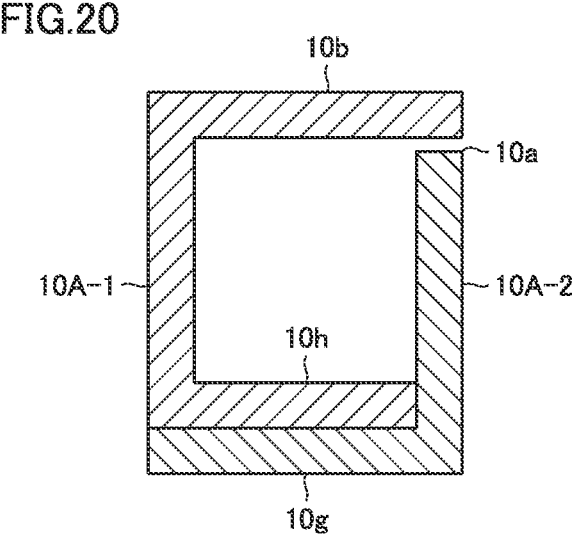
FIG. 20 is a cross-sectional view of the stator on another plane including the rotation axis.

FIG. 19 is a cross-sectional view of the XIX portion of the stator of FIG. 18 on a plane including the rotation axis. FIG. 20 is a cross-sectional view of the XX portion of the stator in FIG. 18 on another plane including the rotation axis. Although bobbin 11 and coil 12 are arranged inside the stator as in FIG. 1 and the like, bobbin 11 and coil 12 are not illustrated in FIGS. 19 and 20.

Claw 10b of magnetic ring member 10A-1 and claw 10b of magnetic ring member 10A-2 are disposed on one side (upper side in FIGS. 19 and 20) with respect to coil 12, and in a cross section (FIG. 20) in a certain plane, first member 10A-1 and second member 10A-2 overlap in the order of small-diameter portion 10h of first member 10A-1 and large-diameter portion 10g of second member 10A-2 in a direction away from the coil on a side (lower side in FIG. 20) opposite to the one side with respect to the coil. In addition, in a cross section (FIG. 19) in the other plane, first member 10A-1 and second member 10A-2 overlap in the order of small-diameter portion 10h of second member 10A-2 and large-diameter portion 10g of first member 10A-1 in a direction away from the coil on the side (lower side in FIG. 19) opposite to the one side with respect to the coil.

In this manner, large-diameter portion 10g of magnetic ring member 10A-1 and small-diameter portion 10h of magnetic ring member 10A-2 are fitted to each other, and large-diameter portion 10g of magnetic ring member 10A-2 and small-diameter portion 10h of magnetic ring member 10A-1 are fitted to each other, such that claws 10b provided on magnetic ring member 10A-1 and claws 10b provided on magnetic ring member 10A-2 are alternately arranged.

Since large-diameter portion 10g and small-diameter portion 10h abut on each other on the cylindrical surface, magnetic ring member 10A-1 and magnetic ring member 10A-2 can be restrained in position without being displaced in the circumferential direction, and the magnetic resistance can be reduced. In addition, since the same number of large-diameter portion 10g and small-diameter portion 10h are provided, large-diameter portion 10g and small-diameter portion 10h are fitted by aligning the positions of cutout portions 10j, and gaps between claws 10b of magnetic ring member 10A-1 and claws 10b of magnetic ring member 10A-2 becomes uniform. Therefore, it is easy to perform phase matching between magnetic ring member 10A-1 and magnetic ring member 10A-2 at the time of assembly of stator 9.

In addition, by providing two magnetic ring members 10A-1 and 10A-2 as components having an identical shape, only one type of die is required for press-forming with the die, so that the initial manufacturing cost can be reduced. In addition, it is possible to suppress the manufacturing cost by eliminating the die replacement at the time of manufacturing the magnetic rings.

Further, by providing large-diameter portion 10g and small-diameter portion 10h and fitting them, a contact area is increased and the magnetic resistance is reduced, and claws 10b can be arranged with uniform gaps, and thus assembly is facilitated.

When magnetic ring member 10A is press-formed, since the outer diameters of two magnetic ring members 10A-1 and 10A-2 to be fitted are substantially the same, it is possible to reduce a step difference in the outer diameters when they are fitted, and it is easy to perform an assembling operation of inserting stator 9 into external ring 7.

Third Embodiment

A stator structure of the claw pole power generation can be applied not only to the bearing but also to an outer-ring spacer. In a third embodiment, an example in which the stator structure of the claw pole generator is applied to an outer-ring spacer of a spindle device will be described.

Figure 21:
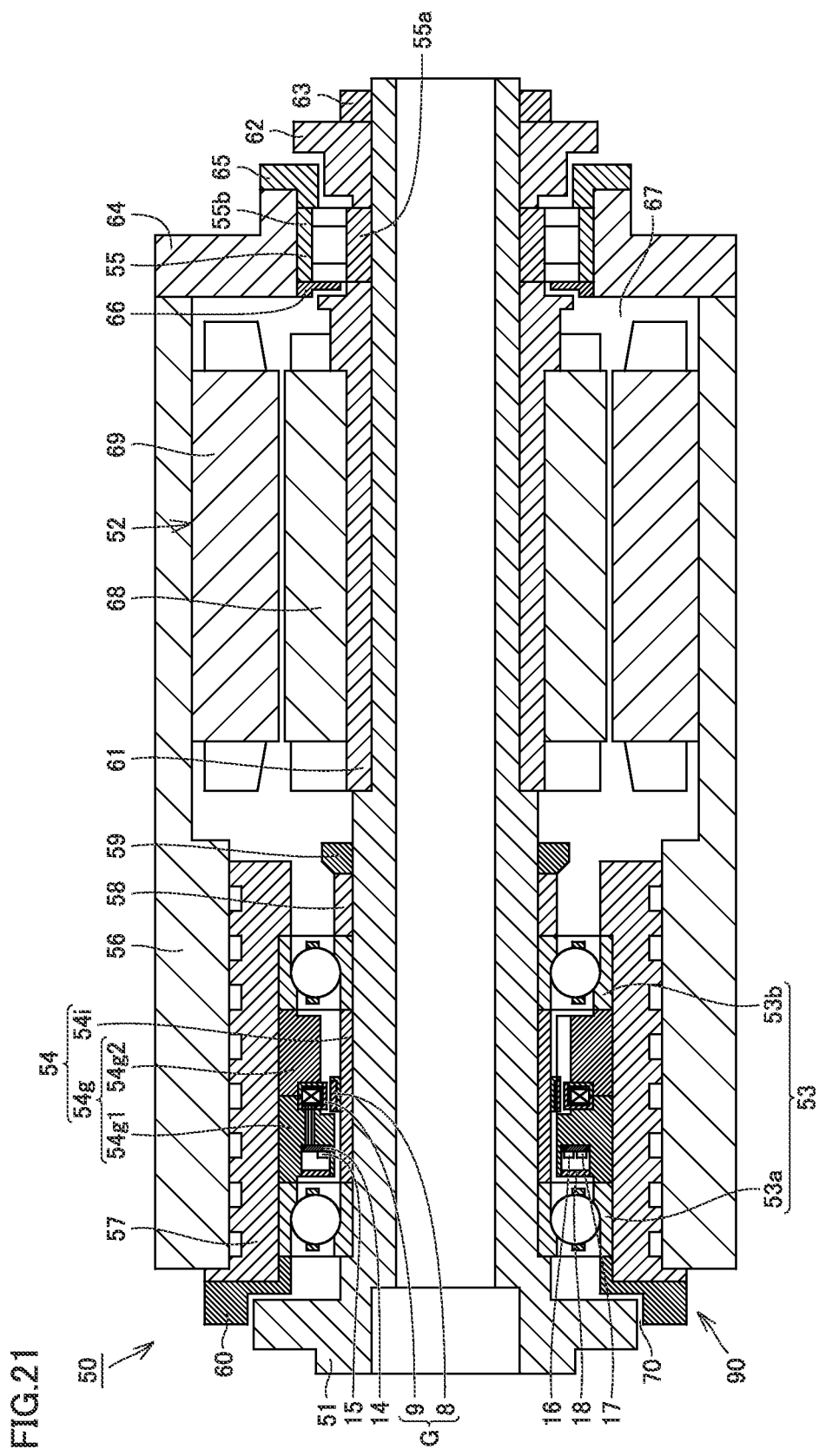
FIG. 21 is a cross-sectional view illustrating a schematic configuration in which a stator structure of a claw pole generator is applied to a bearing device of a spindle device.
Figure 22:
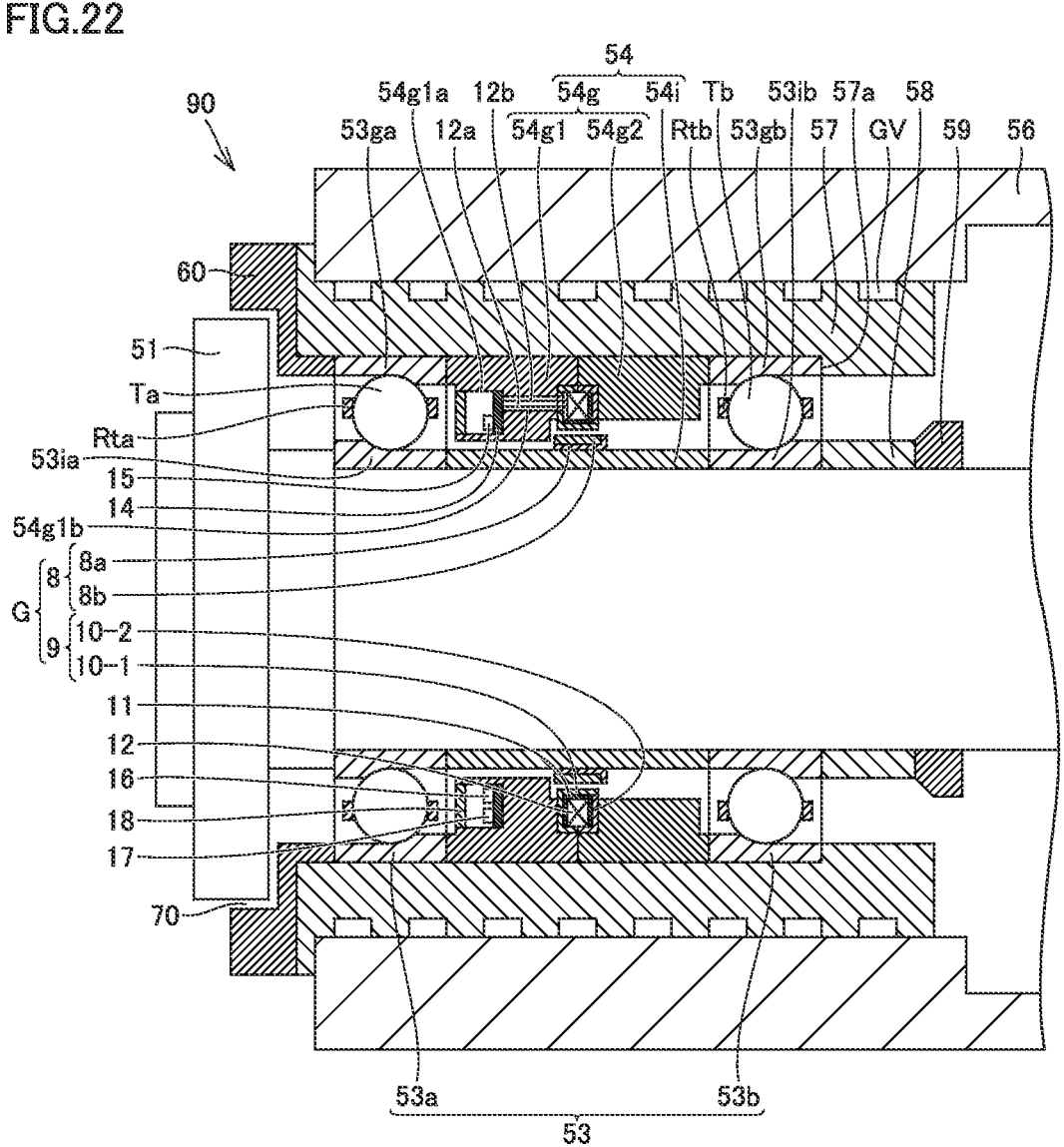
FIG. 22 is an enlarged view of a main part on the left side in FIG. 21.

FIG. 21 is a cross-sectional view illustrating a schematic configuration in which the stator structure of the claw pole generator is applied to a bearing device of the spindle device. FIG. 22 is an enlarged view of a main part on the left side in FIG. 21. FIG. 22 mainly illustrates a bearing device 90.

A spindle device 50 illustrated in FIG. 21 is used as, for example, a built-in motor type spindle device of a machine tool. In this case, a motor 52 is incorporated on one end side of a spindle 51 supported by spindle device 50 for a machine tool spindle, and a cutting tool such as an end mill (not illustrated) is connected to the other end side.

Referring to FIGS. 21 and 22, spindle device 50 includes bearings 53a and 53b, a spacer 54 disposed adjacent to bearings 53a and 53b, motor 52, and a bearing 55 disposed adjacent to motor 52 on a side opposite to spacer 54. Spindle 51 is rotatably supported by a plurality of bearings 53a and 53b provided in a housing 57 embedded in the inner diameter portion of an outer cylinder 56.

Bearing 53a includes an inner ring 53ia, an outer ring 53ga, rolling elements Ta, and a retainer Rta. Bearing 53b includes an inner ring 53ib, an outer ring 53gb, rolling elements Tb, and a retainer Rtb. Spacer 54 includes an inner-ring spacer 54i and an outer-ring spacer 54g.

In order to enable wireless communication described later, it is preferable that rolling elements Ta and Tb are ceramic balls that are nonmetallic insulators, and retainers Rta and Rtb are made of resin.

Inner ring 53ia of bearing 53a and inner ring 53ib of a bearing 5b separated in the axial direction are fitted to spindle 51 in an interference fit state (press fit state). Inner-ring spacer 54i is disposed between inner rings 53ia-53ib, and outer-ring spacer 54g is disposed between outer rings 53ga-53gb.

Bearings 53a and 53b are bearings capable of applying a preload by an axial force, and an angular ball bearing, a deep groove ball bearing, a tapered roller bearing, or the like can be used. An angular ball bearing is used as bearing device 90 illustrated in FIG. 22, and two bearings 53a and 53b are installed in back-to-back duplex (DB).

Outer-ring spacer 54g is divided into two parts of a first outer-ring spacer 54g1 and a second outer-ring spacer 54g2 in the axial direction, and stator 9 of generator G is fixed therebetween. In addition, magnetic ring 8 is fixed to an outer peripheral surface of inner-ring spacer 54i, and stator 9 and multipolar magnet 8b of magnetic ring 8 are arranged to face each other with a gap therebetween, and thus generator G is configured. As generator G, the claw pole generator illustrated in FIGS. 2 to 7 and 15 to 20 can be used.

Magnetic ring 8 includes cored bar 8a and multipolar magnet 8b. Multipolar magnet 8b is obtained by, for example, vulcanizing and bonding a magnetic material obtained by kneading magnetic powder and rubber to cored bar 8a, and then alternately magnetizing N poles and S poles, and is fixed to inner-ring spacer 54i.

Stator 9 includes two magnetic ring members 10-1 and 10-2 having the same shape, bobbin 11, and coil 12. The winding of coil 12 is wound a plurality of times in the circumferential direction of bobbin 11. Although an example of using bobbin 11 is illustrated here, a stator can be similarly configured even if a coil not using bobbin 11 is used.

A groove portion 54g1a is provided on an end surface of first outer-ring spacer 54g1, and circuit board 14 is mounted inside groove portion 54g1a.

Circuit board 14 is provided with power circuit 15 that rectifies AC power generated by generator G and converts the AC power into DC power, sensor 16 that monitors the state of bearing device 90, and wireless communication circuit 17 that wirelessly transmits an output of sensor 16 to the outside. End portion 12a that is the start of winding of coil 12 and end portion 12b that is the end of winding of the coil are connected to circuit board 14 through a hole 54g1b. Here, it is preferable that hole 54g1b is sealed using a sealing material after wiring to prevent oil or the like from entering a side of circuit board 14. When spindle 51 rotates, AC power output from generator G is converted into DC by power circuit 15. Lid 18 that protects circuit board 14 is made of a nonmetallic insulator such as resin, and is fixed inside groove portion 54g1a. The surface of circuit board 14 may be sealed with a resin molding agent instead of lid 18.

As sensor 16, a plurality of sensors such as a temperature sensor, an acceleration sensor, and a load sensor are mounted. For example, when a load sensor (not illustrated) is mounted, the load sensor (not illustrated) is disposed between first outer-ring spacer 54g1 and second outer-ring spacer 54g2, signal processing is performed by circuit board 14, and an output thereof is wirelessly transmitted.

Rolling bearing 55 of a single row is a cylindrical roller bearing. A radial load and an axial load acting on spindle device 50 are supported by bearings 53a and 53b as angular ball bearings. The load in the radial direction acting on spindle device 50 for a machine tool spindle is supported by single-row bearing 55 as a cylindrical roller bearing.

A cooling medium flow path GV is provided in housing 57. By allowing a cooling medium to flow between housing 57 and outer cylinder 56, bearings 53a and 53b can be cooled.

When a bearing with grease lubrication is used as bearings 53a and 53b, a lubricating oil supply passage is unnecessary, but when lubrication of air oil or the like is necessary, a lubricating oil supply passage is provided for outer-ring spacer 54g. Here, the lubricating oil supply passage is not illustrated.

At the time of assembly, first, bearing 53a, spacer 54, bearing 53b, and a spacer 58 are inserted into spindle 51 in the stated order, and an initial preload is applied by tightening a nut 59. Thereafter, spindle 51 to which bearings 53a and 53b are attached is inserted into housing 57 until the right side of outer ring 53gb of bearing 53b in FIG. 22 is brought into contact with a stepped portion 57a provided in housing 57. Finally, a front lid 60 pushes outer ring 53ga of left bearing 53a to fix spindle 51 to housing 57.

By tightening nut 59, a force acts on the end surface of inner ring 53ib of bearing 53b via spacer 58, and inner ring 53ib is pushed toward inner-ring spacer 54i. This force is transmitted to inner ring 53ib, rolling elements Tb, and outer ring 53gb to apply a preload between raceway surfaces of inner ring 53ib and outer ring 53gb and rolling elements Tb, and is also transmitted from outer ring 53gb to outer-ring spacer 54g.

This force is transmitted to outer ring 53ga, rolling elements Ta, and inner ring 53ia in bearing 53a to apply a preload between raceway surfaces of inner ring 53ia and outer ring 53ga of a left bearing 5a and rolling elements Ta. The preload applied to bearings 53a and 53b is determined by, for example, a movement amount limited by a dimensional difference between a width of outer-ring spacer 54g and a width of inner-ring spacer 54i.

Further, in single-row bearing 55 illustrated in FIG. 21, an inner ring 55a is positioned in the axial direction by a cylindrical member 61 and an inner ring retainer 62 fitted to the outer periphery of spindle 51. Inner ring retainer 62 is prevented from coming off by a nut 63 screwed to spindle 51. An outer ring 55b of bearing 55 is sandwiched between a positioning member 65 and a positioning member 66 fixed to an end member 64. Inner ring 55a slides integrally with respect to end member 64 in accordance with expansion and contraction of spindle 51.

Motor 52 that drives spindle 51 is disposed at an intermediate position in the axial direction between bearing 53b and single-row bearing 55 in a space 67 provided between spindle 51 and outer cylinder 56. A rotor 68 of motor 52 is fixed to cylindrical member 61 fitted to the outer periphery of spindle 51, and a stator 69 of motor 52 is fixed to the inner peripheral portion of outer cylinder 56.

Here, a cooling medium flow path for cooling motor 52 is not illustrated.

Outer-ring spacer 54g is provided with generator G, sensor 16, and wireless communication circuit 17 that wirelessly transmits the output of sensor 16 to the outside, and the operation status of spindle device 50 can be monitored and the sensor output can be wirelessly transmitted. In addition, an abnormality determination means (not illustrated) that determines the presence or absence of an abnormality from each sensor output may be mounted on circuit board 14, and an abnormality determination result may be wirelessly transmitted.

The radio wave transmitted from wireless communication circuit 17 passes between outer ring 53ga and inner ring 53ia of bearing 53a, and is emitted from a gap 70 of the labyrinth seal provided by spindle 51 and front lid 60.

Since spindle device 50 performs wireless communication, the wiring does not need to be drawn out from outer-ring spacer 54g. Therefore, it is not necessary to process a groove for wiring on the inner diameter side of housing 57, and the modification of spindle device 50 can be minimized.

In FIGS. 21 and 22, outer-ring spacer 54g and inner-ring spacer 54i are further provided. Magnetic ring 8 is fixed to inner-ring spacer 54i, and stator 9 is fixed to outer-ring spacer 54g so as to face magnetic ring 8. As a modification, although not illustrated, magnetic ring 8 may be fixed to outer-ring spacer 54g, and stator 9 may be fixed to inner-ring spacer 54i so as to face magnetic ring 8. In this case, since the outer ring is rotational, circuit board 14 is fixed to inner-ring spacer 54i.

Summary

Finally, the present embodiment will be summarized again with reference to the drawings.

Referring to FIG. 1, bearing device 1 includes magnetic ring 8 fixed to a rotary member, and a stator 9 fixed to a non-rotary member so as to face magnetic ring 8. Magnetic ring 8 and stator 9 constitute claw pole type generator G. Stator 9 includes coil 12 and a magnetic yoke surrounding coil 12. The magnetic yoke is configured by combining first member 10-1 and second member 10-2 that are magnetic bodies. First member 10-1 includes a plurality of first claws 10b arranged in a comb shape, and second member 10-2 includes a plurality of second claws 10b arranged in a comb shape. The plurality of first claws 10b of first member 10-1 and the plurality of second claws 10b of second member 10-2 are alternately arranged on the surface facing magnetic ring 8. First member 10-1 and second member 10-2 have an identical shape.

Preferably, bearing device 1 further includes outer ring 2, inner ring 3 and a plurality of rolling elements 4 arranged between outer ring 2 and inner ring 3. Magnetic ring 8 is fixed to one of outer ring 2 and inner ring 3. Stator 9 is fixed to the other of outer ring 2 and inner ring 3 so as to face magnetic ring 8.

Preferably, bearing device 90 shown in FIGS. 21 and 22 further includes outer-ring spacer 54g and inner-ring spacer 54i. Magnetic ring 8 is fixed to inner-ring spacer 54i, and stator 9 is fixed to outer-ring spacer 54g so as to face magnetic ring 8. Although not illustrated, magnetic ring 8 may be fixed to outer-ring spacer 54g, and stator 9 may be fixed to inner-ring spacer 54i so as to face magnetic ring 8.

As described above, by providing two magnetic ring members 10-1 and 10-2 as components having an identical shape, only one type of die to be press-formed with the die is required, so that initial manufacturing cost can be reduced. In addition, it is possible to suppress the manufacturing cost by eliminating the die replacement at the time of manufacturing the magnetic ring member.

Stator 9 and magnetic ring 8 have an annular shape through which the rotation axis of bearing device 1 passes. In the cross section of stator 9 in a plane including the rotation axis illustrated in FIGS. 1, 10, 14, and the like, first claws 10b and second claws 10b are arranged on one side with respect to coil 12, and end surface 10f of first member 10-1 and end surface 10f of second member 10-2 abut on the side opposite to the one side with respect to coil 12 in the cross section.

A first recess 10c and a first protrusion 10d are provided on end surface 10f of first member 10-1, and a second recess 10c and a second protrusion 10d are provided on the end surface of the second member. In the cross section, on the side opposite to the one side with respect to coil 12, as illustrated in FIGS. 6 and 7, first recess 10c abuts on second protrusion 10d, and first protrusion 10d abuts on second recess 10c. Here, coil 12 illustrated in FIG. 2 and surrounded by first member 10-1 and second member 10-2 is not illustrated in FIG. 7.

By providing recess 10c and protrusion 10d in this manner, it is easy to align phases of the two magnetic rings at the time of assembly.

As illustrated in FIG. 11, first member 10-1 and second member 10-2 are configured to satisfy $\alpha = 2\pi - 2\theta - \varphi$. Here, $\alpha$ represents a rotation angle between first member 10-1 and second member 10-2, $\theta$ represents an angle indicating a position of first recess 10c from a reference position, and $\varphi$ represents an angle indicating a position of first protrusion 10d from the position of first recess 10c.

First member 10-1 and second member 10-2 are configured to satisfy $\alpha = (i+\frac{1}{2}) \cdot 2\pi/n$. Here, $\alpha$ represents a rotation angle between first member 10-1 and second member 10-2. i represents an integer. n represents the number of the plurality of first claws 10b of first member 10-1 and the number of the plurality of second claws 10b of second member 10-2. $2\pi/n$ represents each pitch P of the plurality of first claws 10b of first member 10-1 and the plurality of second claws 10b of second member 10-2. For example, FIG. 12 illustrates an example of n=6 and i=3.

Stator 9 and magnetic ring 8 have an annular shape through which the rotation axis of bearing device 1 passes. As illustrated in FIGS. 19 and 20, in the cross sections of the stator in the first plane and the second plane including the rotation axis, one of first claw 10b of first member 10A-1 and second claw 10b of second member 10A-2 is disposed on one side (upper side in FIGS. 19 and 20) with respect to coil 12. In the cross section in the first plane (FIG. 20), first member 10A-1 and second member 10A-2 overlap in the order of first member 10A-1 and second member 10A-2 in the direction away from the coil on a side opposite to the one side (lower side in FIG. 20) with respect to the coil. In the cross section in the second plane (FIG. 19), first member 10A-1 and second member 10A-2 overlap in the order of second member 10A-2 and first member 10A-1 in the direction away from the coil on a side opposite to the one side with respect to the coil.

As described above, since first member 10A-1 and second member 10A-2 overlap each other at the portion opposite to claw 10b, the contact area can be increased to reduce the magnetic resistance of the magnetic yoke.

The manufacturing method for manufacturing the bearing device or the spacer includes: punching first member 10-1 and second member 10-2 by press working, using a die having an identical shape; and assembling first member 10-1, second member 10-2, and coil 12 to constitute stator 9.

As described above, by providing two magnetic ring members 10-1 and 10-2 as components having an identical shape, only one type of die to be press-formed with the die is required, so that initial manufacturing cost can be reduced. In addition, it is possible to suppress the manufacturing cost by eliminating the die replacement at the time of manufacturing the magnetic ring member.

The embodiments disclosed herein should be considered to be illustrative in all respects and not restrictive. The scope of the present invention is defined by the claims, instead of the descriptions of the embodiments stated above, and it is intended that meanings equivalent to the claims and all modifications within the scope are included.

REFERENCE SIGNS LIST 1, 1A, 1B, 90: bearing device, 2, 53ga, 53gb, 55b: outer ring, 3, 53ia, 53ib, 55a: inner ring, 4, Ta, Tb: rolling element, 5, Rta, Rtb: retainer, 5a, 5b, 53a, 53b, 55, B: bearing, 6: seal, 7: external ring, 8: magnetic ring, 8a: cored bar, 8b: multipolar magnet, 9, 69: stator, 10, 10-1, 10-2, 10A, 10A-1, 10A-2: magnetic ring member, 10a: groove, 10b: claw, 10c: recess, 10d: protrusion, 10e: hole, 10f: end surface, 10g: large-diameter portion, 10h: small-diameter portion, 10j: cutout portion, 11: bobbin, 12: coil, 12a, 12b: end portion, 13: case, 14: circuit board, 15: power circuit, 16: sensor, 17: wireless communication circuit, 17a: input unit, 17b: arithmetic unit, 17c: transmission/reception unit, 17d: antenna, 18: lid, 19: switch unit, 20: rotation detection unit, 21: battery, 30: ring member, 30a: flange portion, 50: spindle device, 51: spindle, 52: motor, 54, 58: spacer, 54g1a: groove portion, 54g1b: hole, 54g1: first outer-ring spacer, 54g2: second outer-ring spacer, 54g: outer-ring spacer, 54i: inner-ring spacer, 56: outer cylinder, 57: housing, 57a: stepped portion, 59, 63: nut, 60: front lid, G: generator, GV: DC power supply

The invention claimed is:

1. A bearing device that rotatably supports a rotary member, the bearing device comprising:
a magnetic ring fixed to the rotary member; and
a stator fixed to a non-rotary member so as to face the magnetic ring, wherein
the magnetic ring and the stator constitute a claw pole type generator,
the stator includes
a coil, and
a magnetic yoke surrounding the coil,
the magnetic yoke is configured by combining a first member and a second member that are magnetic bodies,
the first member includes a plurality of first claws arranged in a comb shape,
the second member includes a plurality of second claws arranged in a comb shape,
the plurality of first claws and the plurality of second claws are alternately arranged on a surface facing the magnetic ring,
the first member and the second member have an identical shape,
the stator and the magnetic ring have an annular shape through which a rotation axis of the bearing device passes,
one of the plurality of first claws and the plurality of second claws are arranged on one side with respect to the coil in cross sections of the stator in a first plane and a second plane including the rotation axis,
the first member and the second member overlap each other in the order of the first member and the second member in a direction away from the coil on a side opposite to the one side with respect to the coil in the cross section in the first plane, and
the first member and the second member overlap each other in the order of the second member and the first member in a direction away from the coil on a side opposite to the one side with respect to the coil in the cross section in the second plane.

2. The bearing device according to claim 1, further comprising:
an outer ring;
an inner ring; and
a plurality of rolling elements disposed between the outer ring and the inner ring, wherein
the magnetic ring is fixed to one of the outer ring and the inner ring, and
the stator is fixed to the other of the outer ring and the inner ring so as to face the magnetic ring.

3. The bearing device according to claim 1, further comprising:
an outer-ring spacer; and
an inner-ring spacer, wherein
the magnetic ring is fixed to one of the outer-ring spacer and the inner-ring spacer, and
the stator is fixed to the other of the outer-ring spacer and the inner-ring spacer so as to face the magnetic ring.

4. A manufacturing method for manufacturing the bearing device according to claim 1, the manufacturing method comprising:
punching the first member and the second member by press working, using a die having an identical shape; and
assembling the first member, the second member, and the coil to constitute the stator.

5. A bearing device that rotatably supports a rotary member, the bearing device comprising:
a magnetic ring fixed to the rotary member; and
a stator fixed to a non-rotary member so as to face the magnetic ring, wherein
the magnetic ring and the stator constitute a claw pole type generator,
the stator includes
a coil, and
a magnetic yoke surrounding the coil,
the magnetic yoke is configured by combining a first member and a second member that are magnetic bodies,
the first member includes a plurality of first claws arranged in a comb shape, the second member includes a plurality of second claws arranged in a comb shape,
the plurality of first claws and the plurality of second claws are alternately arranged on a surface facing the magnetic ring,
the first member and the second member have an identical shape,
the stator and the magnetic ring have an annular shape through which a rotation axis of the bearing device passes,
the plurality of first claws and the plurality of second claws are arranged on one side with respect to the coil in a cross section of the stator in a plane including the rotation axis,
an end surface of the first member and an end surface of the second member abut on an opposite side to the one side with respect to the coil in the cross section,
a first recess and a first protrusion are provided on the end surface of the first member,
a second recess and a second protrusion are provided on the end surface of the second member,
on the opposite side, the first recess abuts on the second protrusion, and the first protrusion abuts on the second recess, and
the first member and the second member satisfy:

$$\alpha = 2\pi - 2\theta - \varphi$$

wherein a represents a rotation angle between the first member and the second member, $\theta$ represents an angle indicating a position of the first recess from a reference position, and $\varphi$ represents an angle indicating a position of the first protrusion from the position of the first recess.

6. A bearing device that rotatably supports a rotary member, the bearing device comprising:
a magnetic ring fixed to the rotary member; and
a stator fixed to a non-rotary member so as to face the magnetic ring, wherein
the magnetic ring and the stator constitute a claw pole type generator,
the stator includes
a coil, and
a magnetic yoke surrounding the coil,
the magnetic yoke is configured by combining a first member and a second member that are magnetic bodies,
the first member includes a plurality of first claws arranged in a comb shape,
the second member includes a plurality of second claws arranged in a comb shape,
the plurality of first claws and the plurality of second claws are alternately arranged on a surface facing the magnetic ring,
the first member and the second member have an identical shape,
the stator and the magnetic ring have an annular shape through which a rotation axis of the bearing device passes,
the plurality of first claws and the plurality of second claws are arranged on one side with respect to the coil in a cross section of the stator in a plane including the rotation axis,
an end surface of the first member and an end surface of the second member abut on an opposite side to the one side with respect to the coil in the cross section,
a first recess and a first protrusion are provided on the end surface of the first member,
a second recess and a second protrusion are provided on the end surface of the second member,
on the opposite side, the first recess abuts on the second protrusion, and the first protrusion abuts on the second recess, and
the first member and the second member satisfy:

$$\alpha = (i + \tfrac{1}{2}) \cdot 2\pi/n$$

wherein a represents a rotation angle between the first member and the second member, i represents an integer, n denotes a number of each of the plurality of first claws and the plurality of second claws, and $2\pi/n$ represents a pitch of the plurality of first claws and the plurality of second claws.

* * * * *